United States Patent [19]

Mansfield

[11] Patent Number: 4,940,895

[45] Date of Patent: Jul. 10, 1990

[54] IMAGING APPARATUS

[75] Inventor: Daniel I. Mansfield, Leicester, United Kingdom

[73] Assignee: Rank Taylor Hobson, United Kingdom

[21] Appl. No.: 232,607

[22] Filed: Aug. 15, 1988

[30] Foreign Application Priority Data

Aug. 26, 1987 [GB] United Kingdom ............... 8720104

[51] Int. Cl.$^5$ ............................................. G02B 26/10
[52] U.S. Cl. .................................... 250/332; 250/330;
250/338.1; 250/339; 250/334
[58] Field of Search ..................... 250/338.1, 343, 339,
250/341, 330, 370.08, 332, 334

[56] References Cited

U.S. PATENT DOCUMENTS

| | | | |
|---|---|---|---|
| 3,926,835 | 12/1975 | Tucker | 252/62.62 |
| 4,023,201 | 5/1977 | Faulkner | 374/124 |
| 4,099,883 | 7/1978 | Berger | 356/417 |
| 4,271,358 | 6/1981 | Schwarz | 250/338.1 |
| 4,421,985 | 12/1983 | Billingsley | 250/353 |
| 4,482,807 | 11/1984 | Blackburn et al. | 250/370.08 |
| 4,549,079 | 10/1985 | Terasaka et al. | 250/339 |
| 4,692,618 | 7/1987 | Klatt | 250/330 |
| 4,725,733 | 2/1988 | Horman et al. | 250/339 |
| 4,788,428 | 11/1988 | Metcalf et al. | 250/330 |

FOREIGN PATENT DOCUMENTS 7206724 2/1972 France .
WO86/06214 10/1986 PCT Int'l Appl. .
2131649 6/1984 United Kingdom .

OTHER PUBLICATIONS

Medical Thermography, C. H. Jones, (I.E.E.E. Proceedings, vol. 134, Feb., 1987, pp. 225–236).

Primary Examiner—Constantine Hannaher
Assistant Examiner—J. Eisenberg
Attorney, Agent, or Firm—Lerner, David, Littenberg, Krumholz & Mentlik

[57] ABSTRACT

A thermal imager having an array of sprite detectors is provided with a novel means for reducing or eliminating lininess in the reproduced image. This means comprises a low pass optical filter which cuts out wavelengths above 11.5 microns and adjustable gain buffer amplifiers in the respective channels. It is found that with the use of the optical filter the gains of the buffer amplifiers may be preset, when setting up the apparatus, to eliminate lininess and it is not necessary to include complex and noisy circuitry for continuously monitoring the signals output by the detectors and then applying appropriate corrections to the individual channels during operation of the apparatus, as in the prior art.

17 Claims, 4 Drawing Sheets

IMAGING APPARATUS

This invention relates to imaging apparatus and is particularly concerned with thermal imagers.

Conventional thermal imagers comprise a scanning optical system which scans a thermal image of the field of view across an array of thermal detectors whose output signals are electronically processed and then applied to a display device such as a cathode ray tube for reproducing an image of the field of view of the optical system. Typically, the array of detectors comprises a small number of detectors, such as eight, which are arranged in a row corresponding to the vertical direction in the scene (and in the image) and across which the thermal image is scanned in a direction corresponding to the horizontal direction. The eight detectors thus simultaneously produce eight video signals corresponding to eight successive lines in a field. The scanning optical system is arranged to perform a vertical scan in addition to a horizontal scan so that over a period of time different horizontally extending bands in the image are scanned across the detectors to make up a complete field.

Various forms of detector arrays are known. One known detector array comprises horizontally extending strips of cadmium-mercury-telluride. A bias field is applied across each strip so that carriers generated by a pixell cell in the scanned image move along the strip in synchronism with the horizontal scanning of the image. This provides good signal to noise ratio. Such detector arrays are known as "sprite" detectors.

A problem which arises with thermal detector arrays, in particular arrays of sprite detectors, or the like is that different detector elements in the array have different response characteristics which tend to produce patterns of dark and/or bright lines on the display. It is known to reduce this "lininess" by providing signal processing circuitry through which the signals from the detectors are passed and which operates to compensate for the difference in the response characteristics of the different elements. A problem with such compensating circuits is that they produce noise and thereby reduce the signal to noise ratio in the displayed image.

One aspect of the invention concerns reducing or eliminating the above problem. In a preferred embodiment, the invention provides thermal imaging apparatus including optical filter means through which energy is passed to the detector array and which is operative to reduce or eliminate energy of predetermined wavelengths. In one preferred embodiment, which is particularly applicable to sprite detectors, energy having a wavelength greater than a predetermined wavelength is reduced or eliminated. In a further preferred embodiment, also particularly applicable to a sprite detector, energy outside a predetermined wavelength band is eliminated or reduced by the filter. It has been found that the use of an optical filter in this way can substantially reduce or eliminate the above described lininess problem without the need for noisy electronic circuitry to compensate for differences in the response characteristics of the detector elements.

In an alternative aspect, the invention provides thermal imaging apparatus having a plurality of different filters preferably having different transmissivity selectively interposable in the optical path. The different filters may all be mounted on a turret which is movable to bring the different filters into the optical path as required. Such filters may be as described in connection with the first mentioned aspect of the invention for reducing or eliminating lininess.

The invention is described further by way of example with reference to the accompanying drawings in which.

Figure 1:
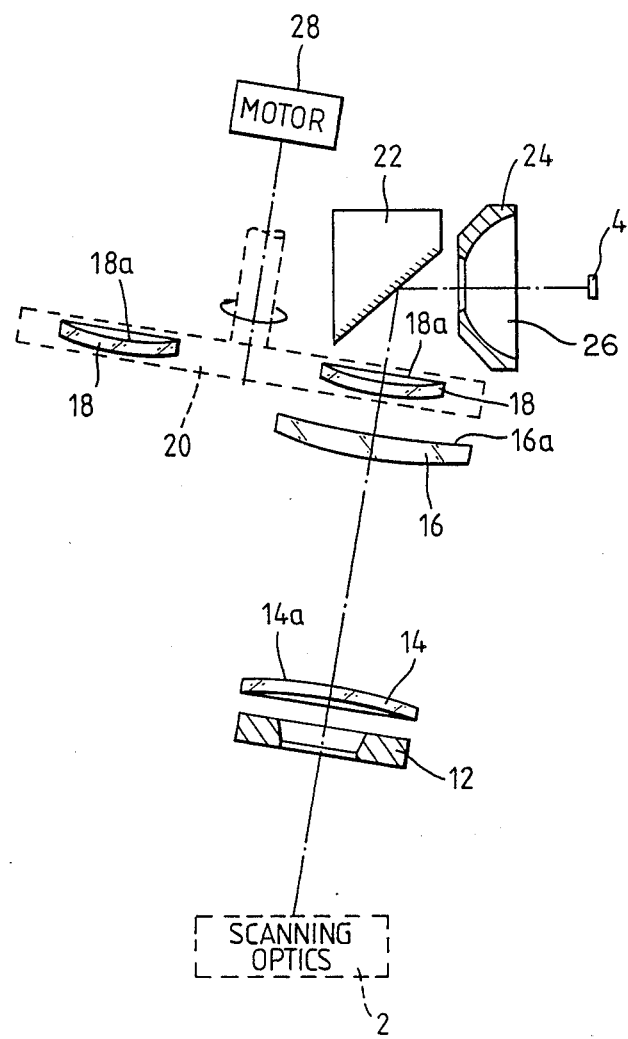
FIG. 1 is a diagrammatic representation of part of a first embodiment of the present invention.
Figure 2:
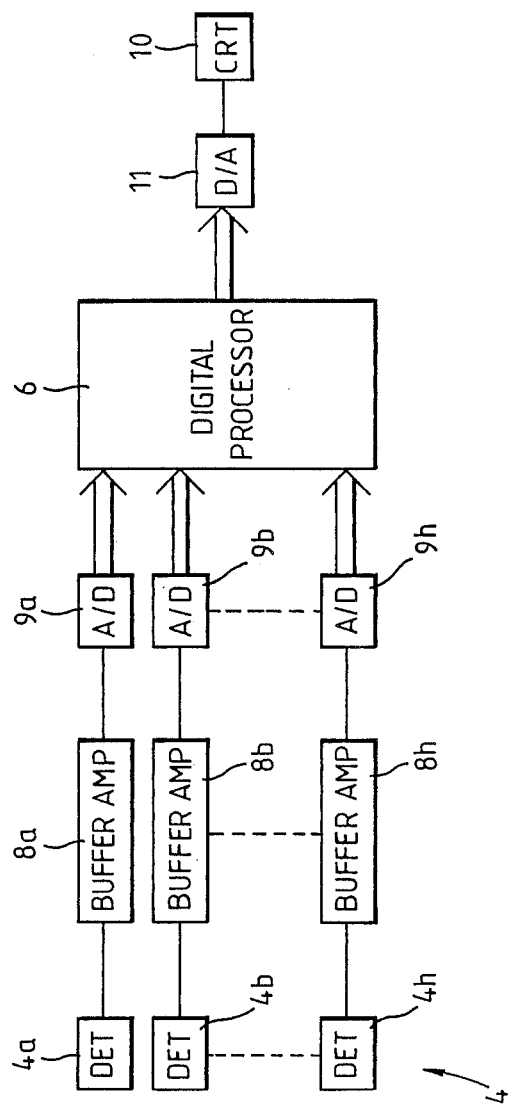
FIG. 2 is a block diagram illustrating electronic circuitry included in the embodiment of FIG. 1.

With reference to FIGS. 1 and 2, the thermal imager comprises a conventional scanning optical system 2, shown only as a block which is operative to produce a thermal image of a field of view and scan the image horizontally and vertically across a sprite detector 4. This comprises eight detector elements $4a$ to $4h$ (FIG. 2) each comprising a strip of cadmium-mercury-telluride extending in the horizontal scan direction and biassed so that carriers produced therein drift along the strip in sychronism with the horizontal scanning movement of the image, in a well known manner. The signals from the eight detector elements $4a$ to $4h$ are supplied to a digital signal processing circuit 6 via respective buffer amplifiers $8a$ to $8h$ and analogue-to-digital converters $9a$ to $9h$. Thus, the processing circuit 6 receives simultaneously eight digital image signals representing eight successive lines in a field. The signal processing circuit 6 processes the image signals in a conventional manner to improve the quality of the image to be produced and supplies a video signal to a display CRT 10 via a digital-to-analogue converter 11 for reproduction of an image of the field of view.

Energy from the scanning optical system 2, which may include rotating and/or oscillating mirrors (not shown) for effecting the horizontal and vertical scanning of the image, is supplied to the detector 4 through a stop ring 12, a low pass or cut-on filter 14 which blocks wavelengths below about 7.5 or 8 microns and passes wavelengths above about 7.5 or 8 microns, an imaging lens 16, a selected one of a plurality of further filters 18 mounted on a rotatable turret 20 and a plane mirror 22. As is conventional, the detector 4 is contained in a cooled housing (not shown) in front of which a cold shield 24 of known type is positioned with a concave reflective inner surface 26 facing the detector 4. The cooled housing (not shown) and cold shield 24 isolate the detector 4 from the effects of heat radiated by other parts of the apparatus. The turret 20 is driven by an electric motor 28 so that any selected one of the filters 18 may be positioned in the optical path.

Figure 3:
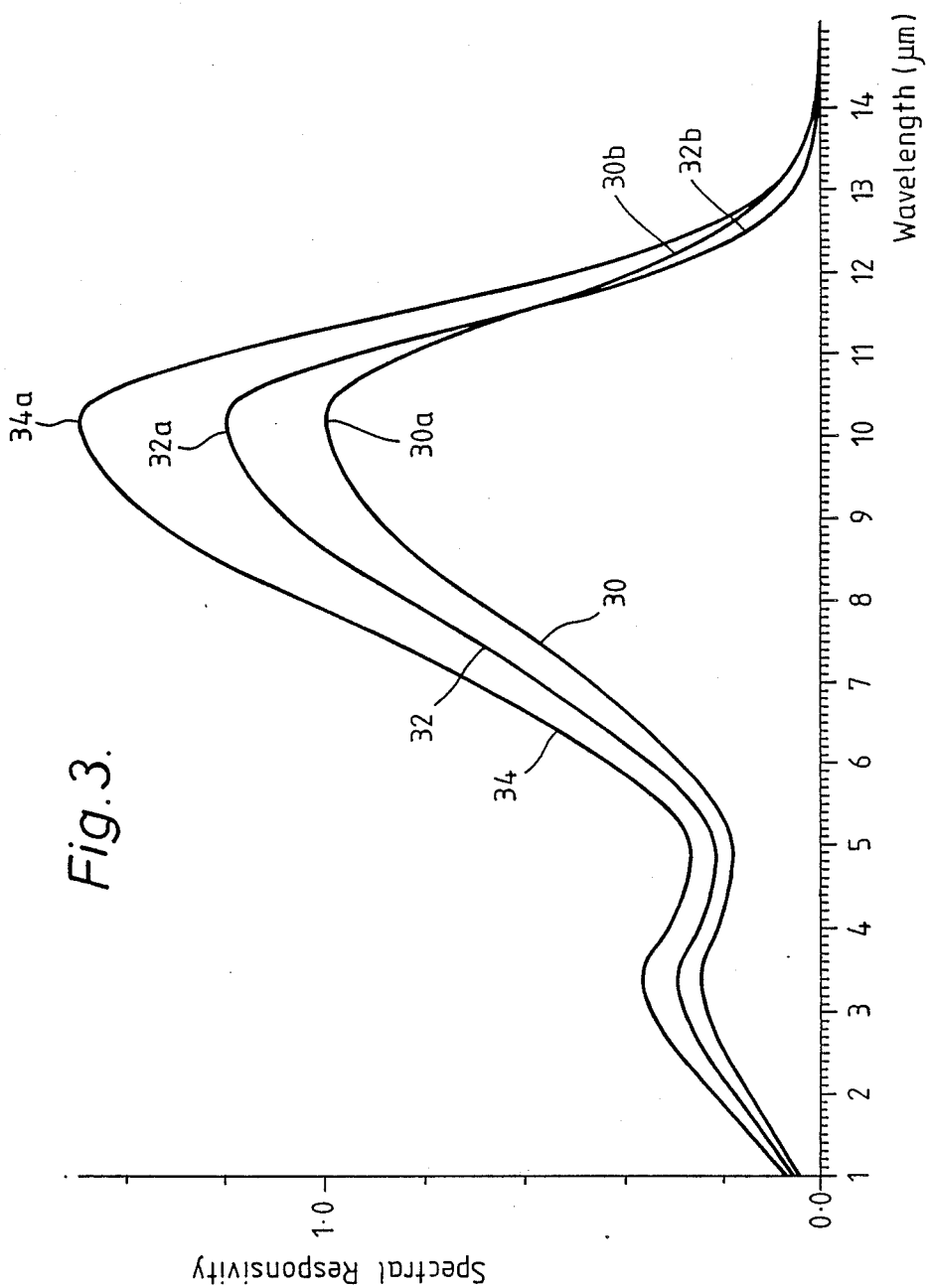
FIG. 3 is a graph showing spectral responsivity against wavelength for a number of thermal detector elements.

Even though great care may be exercised in the manufacture of an array of detector elements, inevitably differences in the responsivities of the different elements arises. The graphs 30, 32 and 34 in FIG. 3 illustrate a typical example of such differences for three detector elements such as the elements $4a$, $4b$ and $4c$ in the array of elements made of cadmium-mercury-telluride already referred to. In FIG. 3, the curve 30 is normalized so that its main peak $30a$, which occurs at 10.25 microns, has a responsivity of 1.0. The main peaks $32a$ and $34a$ of the curves 32 and 34 which also occur at 10.25 microns are shown as having responsivities of 1.2 and 1.5 respectively in FIG. 3. However, even though the responsivity of a given element may be greater than that of another element at a given wavelength, the situation may be reversed at other wavelengths. Thus, in FIG. 3, curve 30 is shown as crossing curve 32 at a wavelength of about 11.5 microns so that, above this wavelength, portion 30b of curve 30 has a responsivity greater than portion 32b of curve 32. Also, FIG. 3 indicates that curve 30 intercepts curve 34 at a little over 13 microns. Thus it will be seen from FIG. 3 and appreciated from the foregoing that these detectors exhibit a range of responsivities and that this range of responsivities is significantly diverse at long wavelength.

FIG. 3 also illustrates that as wavelength decreases from about 9 microns, the curves 30, 32 and 34 get closer to each other thus indicating that the responsivities of the three detectors are closer to each other than at wavelengths of around 9 or 10 microns.

As a consequence of the different responsivities of different detector elements, bright and/or dark lines will appear in the image reproduced on the CRT 10 unless special steps are taken. Further, the location and relative brightness of the lines will vary as the scene being scanned by the scanning means 2 changes since, as shown in FIG. 3, the difference in responsivity between the different detector elements varies as the wavelength of the radiation varies. In the prior art, electronic circuitry has been provided which examines the output of all of the detectors continuously and applies a correction to each of the individual signals derived from the respective individual detectors so as to compensate for the difference in responsivity and thereby reduce the lininess of the image. Such circuitry introduces noise and is therefore not entirely satisfactory.

In the preferred embodiment of the present invention, lininess is significantly reduced or eliminated by filtering out wavelengths above a predetermined wavelength, the difference in responsivity in the remaining wavelengths being compensated for by appropriately presetting the relative gains of buffer amplifiers 8a to 8h in the respective channels when setting up the apparatus. By way of example, a filter may be included to cut off wavelengths above say about 11 to 11.5 microns. Once the apparatus has been set up with the gain of amplifiers 8a to 8h appropriately preadjusted, lininess is substantially eliminated without the need for the type of prior art circuitry mentioned above. Further, and unexpectedly, it has been found that the magnitude of the output signal for a given input energy increases when wavelengths above 11 to 11.5 microns are filtered out compared to the output signal obtained when such wavelengths are permitted to reach the detector.

Thus, the invention not only reduces lininess but also surprisingly improves sensitivity or responsivity.

In the preferred embodiment, optical filters are included for cutting off wavelengths above 11 to 11.5 microns and for cutting off wavelengths below about 7.5 microns. Further, different filters are provided having different transmissivities so that the sensitivity of the thermal imager may be changed.

Figure 4:
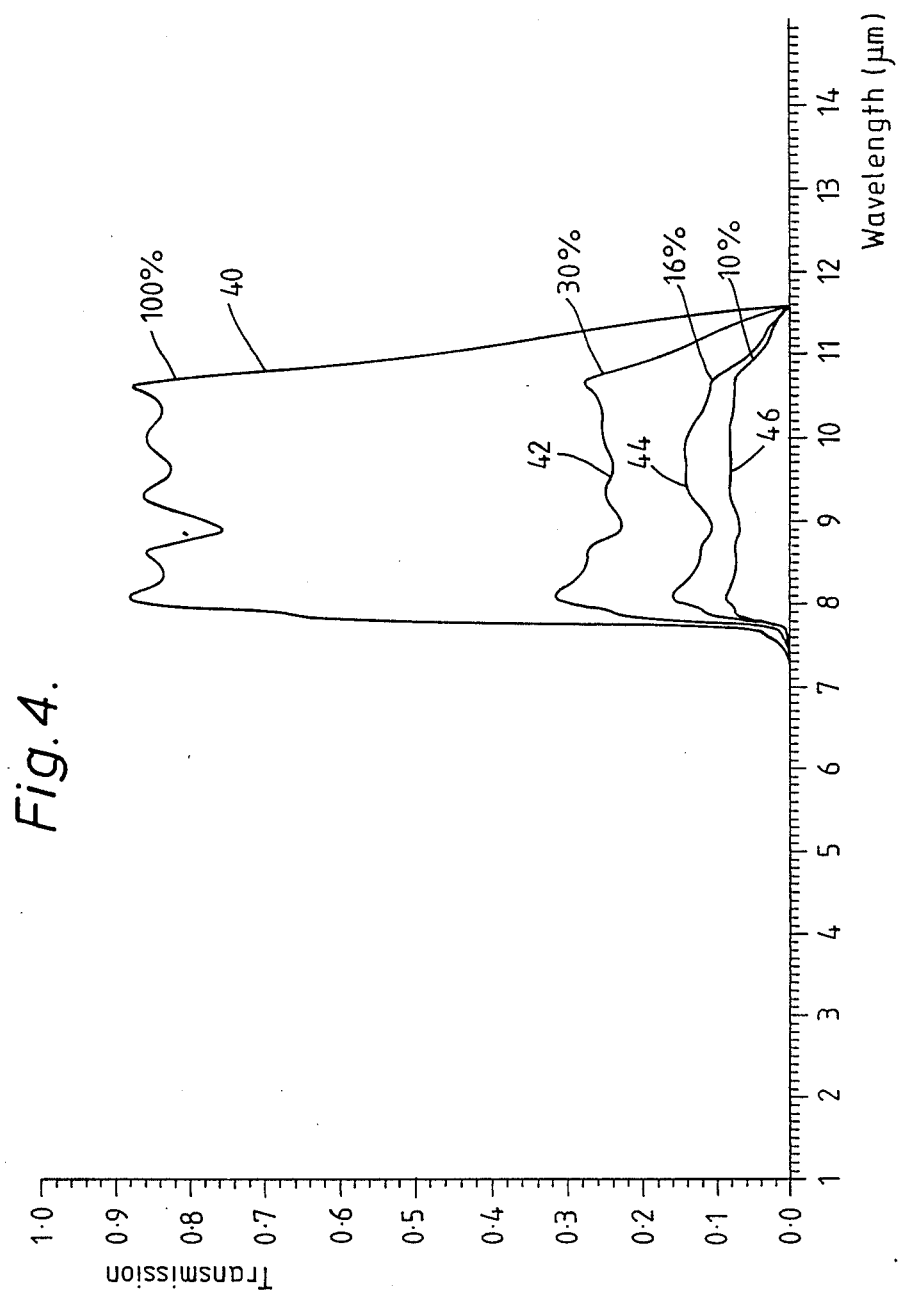
FIG. 4 illustrates preferred characteristics of four different optical filters included in the embodiment of FIG. 1.

In the embodiment of FIG. 1, there are four filters 18 (although only two can be seen in the drawing). Each of the filters cuts off wavelengths above approximately 11.5 microns and each has a different transmissivity from the others. The transmissivity characteristics of the apparatus of FIG. 1 when different ones of the four filters 18 are selected are illustrated in the graphs of FIG. 4, in which curve 40 illustrates selection of a filter 18 with a 100% transmissivity, curve 42 illustrates selection of a filter 18 with 30% transmissivity, curve 44 illustrates selection of a filter 18 with 16% transmissivity and curve 46 illustrates selection of a filter 18 with 10% transmissivity.

By providing a number of different filters 18 each operable to transmit a different proportion of the energy in the transmitted wavelength band, the sensitivity of the thermal imager can be easily changed simply by changing the filter 18, in order to accommodate different temperature ranges in the field of view. Thus, for example, if the field of view is particularly hot, the 10% filter 18 would be used, if the field of view is in an intermediate temperature range the 16% or 30% filter would be used and if the field of view is relatively cold the 100% filter would be used.

Methods of fabricating thermal or infra red filters are known and need not be described in detail. Such filters may, for example, comprise thin films formed on a germanium substrate. For example, to produce a filter which cuts off wavelengths above about 11 to 11.5 microns, a thin film multilayer of germanium and zinc sulphide may be formed on one surface of a germanium substrate in a known manner. To produce a suitable filter 18, the opposite surface of the germanium substrate may have formed thereon a suitable thin film multilayer filter which reduces the transmitted energy by the required percentage.

As shown in FIG. 1, the surfaces 18a of the filters 18 which face the detector 4 are concave. The centre of curvature of these surfaces is positioned close to the detector to provide a "cold shielding" effect in a well known manner. Similarly, the surface 16a of the lens 16 facing the detector 4 is concave and the surface 14a of the filter 14 is curved for the same purpose but, since the filter 14 is on the opposite side of the lens 16 to the detector 4, the surface 14a is convex rather than concave.

With the arrangement described with reference to FIGS. 1 to 4, it is found that lininess in the image due to different response characteristics of the detector elements 4a to 4h is substantially eliminated without the need to including noisy compensating circuits for this purpose in the signal processing circuitry 6 and that an improved signal to noise ratio in the displayed image is produced compared to apparatus in which this compensation in achieved in the signal processing circuitry.

Various modifications are possible within the scope of the invention. For example, whilst the filter characteristics illustrated in FIG. 4 are preferred, it is possible to depart from these within the scope of the invention. For example, complete cut-off of frequencies above about 11 to 11.5 microns, whilst being preferred, is not essential since lininess may be reduced by reducing the energy having a wavelength greater than this rather than completely cutting it off. Further, the cut-off point can be varied but increasing the wavelength at which cut off takes place reduces the effectiveness of the filter in eliminating lininess whereas reducing the wavelength of the cut off point too far may adversely affect the sensitivity of the system. Preferably, therefore, the cut-off point is at some value between 11 and 12 microns. The filter selected will depend upon the characteristics of the particular detector elements and may thus be either a high pass filter or a band pass filter.

Although in the embodiment of the invention described with reference to the drawings, the buffer amplifiers have manually preadjustable gains which are preset, when setting up the apparatus, to different levels to compensate for the different characteristics of the respective detector elements, such correction may be applied in other ways. For example, preset gains may be applied to the signals derived from the different detectors within the digital processing circuitry rather than within the buffer amplifiers.

Although in the illustrated embodiment, digital processing circuitry has been included, it would be possible instead for all of the circuitry to be analogue.

Although the invention has been illustrated in a thermal imager in which the image is scanned across a detector array, the invention may also be applied to systems in which a stationary image is produced, such as systems utilising a so called "staring" array.

Although in the embodiment illustrated in FIG. 1, the various filters have been positioned between the scanning optical system and the detector array, it is possible within the scope of the invention to position the filter or filters in front of the optical system. For example, if the optical system comprises a telescope, a suitable filter, such as a filter which cuts off or reduces wavelengths above a certain value or outside a certain band width, may be positioned on the front of the telescope.

We claim:

1. Thermal imaging apparatus comprising:
   an array of parallel thermal detectors, which detectors exhibit a range of different responsivities, which range is significantly diverse at wavelengths greater than a predetermined long wavelength;
   optical means for directing thermal energy radiation to said array of parallel detectors;
   inhibiting means effective to inhibit passage to said detector array of radiation of at least a range of wavelengths greater than said predetermined long wavelength; and
   electronic means operable to apply differing preset gain to each signal derived from a respective one of said parallel detectors, which preset gain differs according to the different detector responsivities thereof, and compensates at least partly for said different detector responsivities.

2. Appartus according to claim 1 wherein said predetermined long wavelength is in the range 11 to 12 microns.

3. Apparatus according to claim 2, wherein said predetermined long wavelength is approximately 11 to 11.5 microns.

4. Apparatus according to claim 1, wherein said inhibiting means is effective further to inhibit passage to said detector array of wavelengths below a predetermined short wavelength.

5. Apparatus according to claim 4, wherein said predetermined short wavelength is in the range 7 to 9 microns.

6. Apparatus according to claim 5, wherein said predetermined short wavelength is substantially 7.5 to 8 microns.

7. Apparatus according to claim 1, wherein said inhibiting means comprises optical filter means.

8. Apparatus according to claim 7, wherein said optical filter means comprises a plurality of filters having different transmissivities, the appratus including means for interchanging said different filters.

9. Apparatus according to claim 8, arranged so that upon selection of a said first filter substantially 100% of energy in a predetermined wavelength band is transmitted, if the second said filter is selected, substantially only 30% of said energy is transmitted in said band, if a third said filter is selected substantially only 16% of said energy in said band is transmitted and if a fourth said filter is said selected substantially only 10% of said energy in said band is transmitted.

10. Apparatus according to claim 1, wherein said detectors each comprise cadmium-mercury-telluride.

11. Apparatus according to claim 10, wherein said cadmium-mercury-telluride is arranged in a strip which is biassed to cause carrier drift along said strip, said optical system comprises scanning means operable to scan an image across said detector array, said scanned image being substantially sychronised with said charge carrier drift.

12. Optical apparatus, for use in a thermal imager, comprising:
   optical means for forming a thermal image of a scene to be detected by an array of parallel detectors; and
   inhibiting means which is effective to inhibit passage to said detector array of radiation of at least a range of wavelengths above a pre-determined long wavelength in the range 11 to 11.5 microns and also is effective to allow passage to said detector array of radiation at all wavelengths above 9 microns up to said predetermined long wavelength.

13. Apparatus according to claim 12 wherein said inhibiting means also is effective to inhibit passage to said detector array of radiation at all wavelengths below a predetermined short wavelength in the range 7 to 9 microns.

14. Apparatus according to claim 13, wherein said predetermined short wavelength is substantially 7.5 to 8 microns.

15. Apparatus according to claim 12, wherein said inhibiting means comprises optical filter means.

16. Apparatus according to claim 15, wherein said optical filter means comprises a plurality of filters each effective to allow passage to said detector array of radiation at all wavelengths above 9 microns up to said predetermined long wavelength and each having a different respective transmittance, the apparatus including means for interchanging said filters.

17. Apparatus according to claim 16, wherein said plurality of filters includes:
   a first filter having a transmittance of substantially 100%;
   a second filter having a transmittance of substantially only 30%;
   a third filter having a transmittance of substantially only 16%; and
   a fourth filter having a transmittance of substantially only 10%.

* * * * *